(12) United States Patent
Zhang

(10) Patent No.: US 11,888,131 B1
(45) Date of Patent: Jan. 30, 2024

(54) SYSTEMS AND METHODS FOR STORING BATTERIES

(71) Applicant: Guangsheng Zhang, Madison, AL (US)

(72) Inventor: Guangsheng Zhang, Madison, AL (US)

(73) Assignee: Board of Trustees of the University of Alabama for and on behalf of the University of Alabama in Huntsville, Huntsville, AL (US)

(*) Notice: Subject to any disclaimer, the term of this patent is extended or adjusted under 35 U.S.C. 154(b) by 0 days.

(21) Appl. No.: 17/191,304

(22) Filed: Mar. 3, 2021

Related U.S. Application Data

(60) Provisional application No. 63/060,113, filed on Aug. 2, 2020, provisional application No. 62/984,629, filed on Mar. 3, 2020.

(51) Int. Cl.
*H01M 10/613* (2014.01)
*H01M 50/244* (2021.01)
(Continued)

(52) U.S. Cl.
CPC ....... *H01M 10/613* (2015.04); *H01M 10/443* (2013.01); *H01M 10/486* (2013.01); *H01M 10/635* (2015.04); *H01M 50/244* (2021.01)

(58) Field of Classification Search
CPC ............. H01M 10/613; H01M 10/635; H01M 50/244; H01M 10/443; H01M 10/486
See application file for complete search history.

(56) References Cited

U.S. PATENT DOCUMENTS

| 2003/0078071 A1* | 4/2003 | Uchiyama | H04M 1/57 455/415 |
| 2005/0024011 A1* | 2/2005 | Chen | H02J 7/0044 320/107 |

(Continued)

FOREIGN PATENT DOCUMENTS

| WO | WO-2019244489 A1 * | 12/2019 | ............. B60L 50/60 |

OTHER PUBLICATIONS

Zhang, et al., "In-Situ Measurement of Current Distribution in a Li-Ion Cell," Journal of the Electrochemical Society 160, 2013.
(Continued)

*Primary Examiner* — Jane J Rhee
(74) *Attorney, Agent, or Firm* — Maynard Nexsen PC; Brian T. Sattizahn

(57) ABSTRACT

A battery storage system is configured to store batteries in a safe manner that reduces the threat of thermal runaway. Batteries held by the system are electrically connected to at least one load that is powered by energy from the batteries, thereby depleting the charge level of the batteries. In some embodiments, the load is a temperature control device that is configured to cool the batteries to help prevent a thermal runaway condition during storage. That is, discharging of the battery helps not only to reduce the charge levels in the batteries, thereby decreasing the likelihood of an occurrence of thermal runaway, but also cool the batteries further decreasing the likelihood of such an occurrence. Thus, over time, the battery storage system efficiently controls the charge levels and temperatures of the batteries so that a thermal runaway condition is unlikely.

26 Claims, 8 Drawing Sheets

(51) Int. Cl.
  *H01M 10/635* (2014.01)
  *H01M 10/48* (2006.01)
  *H01M 10/44* (2006.01)

(56) References Cited

U.S. PATENT DOCUMENTS

| | | | | |
|---|---|---|---|---|
| 2008/0174269 | A1* | 7/2008 | DeRome | H02J 7/0047 320/112 |
| 2014/0193683 | A1* | 7/2014 | Mardall | B60K 1/04 429/99 |
| 2016/0249918 | A1* | 9/2016 | Shelton, IV | A61B 90/70 227/175.1 |
| 2019/0312322 | A1* | 10/2019 | Ahn | H01M 10/6567 |
| 2021/0273270 | A1* | 9/2021 | Fujikawa | H01M 10/6568 |

OTHER PUBLICATIONS

Zhang, et al., "Effects of Non-Uniform Current Distribution on Energy Density of Li-Ion Cells," Journal of the Electrochemical Society, 160, 2013.

Zhang, et al., "In Situ Measurement of Radial Temperature Distributions in Cylindrical Li-Ion Cells," Journal of the Electrochemical Society, 161, 2014.

Zhang, et al., "Reaction Temperature Sensing (RTS)-based Control for Li-Ion Battery Safety," Scientific Reports, 5, 2015.

Wang, et al., "A Fast Rechargable Lithium-Ion Battery at Subfreezing Temperatures," Journal of the Electromechanical Society, 163, 2016.

Yang, et al., "Fast Charging of Lithium-Ion Batteries at all Temperatures," Proceedings of the National Academy of Sciences, 115, 2018.

Gaines, et al., "Key Issues for Li-Ion Battery Recycling," MRS Energy & Sustainability, 5, 2018.

"Lithium-Ion Battery Recycling Prize Official Rules," US Department of Energy, https://americanmadechallenges.org/batteryrecycling/battery-recycling-prize-rules-and-scoring-criteria.pdf, 2019.

Melcher, et al., "Modeling and Simulation of the Thermal Runaway Behavior of Cylindrical Li-Ion Cells-Computing of Critical Parameters," Energies, 9, 2016.

Zhang, et al., "Rapid Restoration of Electric Vehicle Battery Performance While Driving at Cold Temperatures," Journal of Power Sources, pp. 1-6, 2017.

Zhang, et al., "Rapid self-heating and internal temperature sensing of lithium-ion batteries at low temperatures," Electrochimica Acta 218, pp. 149-155, 2016.

\* cited by examiner (Top View)

(Side View)

SYSTEMS AND METHODS FOR STORING BATTERIES

CROSS REFERENCE TO RELATED APPLICATION

This application claims priority to U.S. Provisional Patent Application No. 62/984,629, entitled "Systems and Methods for Storing and Transporting Batteries" and filed on Mar. 3, 2020, which is incorporated herein by reference. This application also claims priority to U.S. Provisional Patent Application No. 63/060,113, entitled "Systems and Methods for Storing Batteries" and filed on Aug. 2, 2020, which is incorporated herein by reference.

RELATED ART

Batteries often contain heavy metals and toxic chemicals that can harm the environment when improperly disposed. Battery recycling is a process that reuses material from old batteries to manufacture new batteries and/or other products. Battery recycling not only helps to reduce waste and alleviate environmental concerns regarding the disposal of depleted batteries but also helps to satisfy demand for raw materials in the manufacture of new batteries.

However, the transportation and handling of batteries, particularly used or damaged batteries, can cause certain safety concerns. In this regard, batteries have been known to overheat in certain circumstances potentially causing fires or other unsafe conditions. Thermal runaway is a condition where the temperature of a battery rapidly increases to dangerous levels that can result in fire or burns. This condition can be triggered by a variety of factors. As an example, if a battery is crushed or damaged, a short circuit or chemical reaction within the battery can cause temperature to increase. In other cases, other types of events, such as external heating, can cause an increase in battery temperature. The increase in temperature caused by any of these events can change exothermic reactions within the battery, and these exothermic reactions may be accelerated by temperature rise. Thus, rising temperature causes the battery to release more energy that further accelerates the exothermic reactions causing further temperature increases. The result is a rapid and uncontrolled rise in temperature that can trigger a fire, explosion, or some other destructive event.

Generally, the threat of thermal runaway is higher for batteries that have a higher level of charge and are at a higher temperature. Thus, to help prevent fires and other dangerous conditions at recycling facilities, it is generally desirable to recycle batteries that have been discharged. However, used batteries coming to these plants may be at various charge levels making it challenging to ensure their safe handling and transportation.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for storing batteries in a safe manner that reduces the threat of thermal runaway. A battery storage system in accordance with some embodiments of the disclosure has a battery holding apparatus that holds one or more batteries. The batteries are electrically connected to at least one load that is powered by energy from the batteries, thereby depleting the charge level of the batteries. In some embodiments, the load is a temperature control device that is configured to use the energy from the batteries to control the temperature of the batteries in a desired manner. As an example, the energy may be used to cool the batteries to help prevent a thermal runaway condition during storage. That is, discharging of the battery helps not only to reduce the charge levels in the batteries, thereby decreasing the likelihood of an occurrence of thermal runaway, but also cool the batteries further decreasing the likelihood of such an occurrence. Thus, over time, the battery storage system efficiently controls the charge levels and temperatures of the batteries so that a thermal runaway condition is unlikely.

Figure 1:
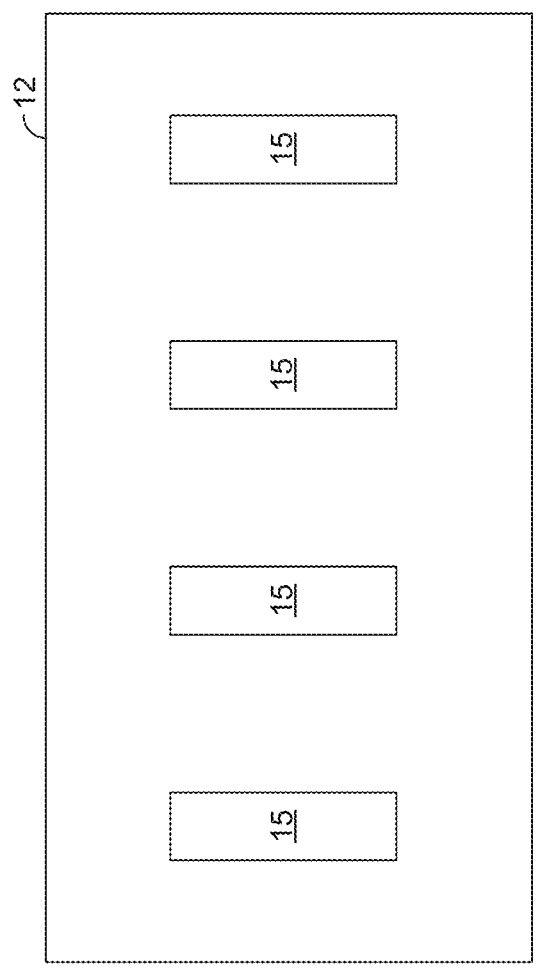
FIG. 1 is a block diagram illustrating an exemplary embodiment of a battery storage system.
Figure 2:
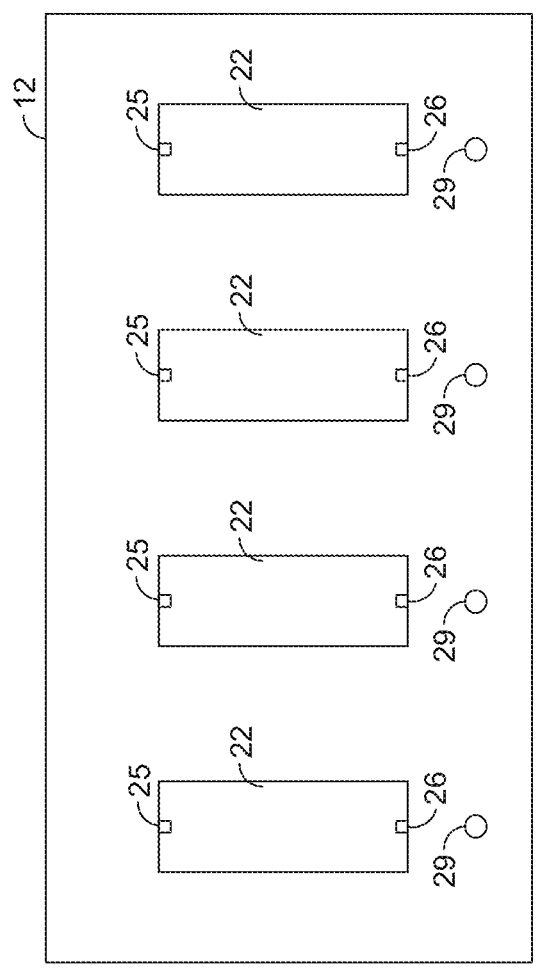
FIG. 2 is a top view of a battery holding apparatus, such as is depicted by FIG. 1.
Figure 3:
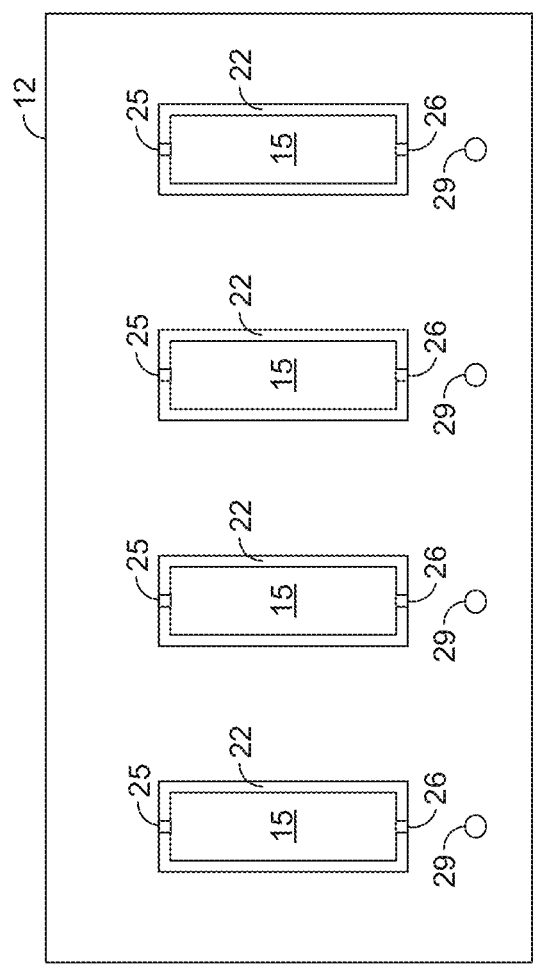
FIG. 3 is a side view of the battery holding apparatus depicted by FIG. 2 with batteries inserted into cavities of the battery holding apparatus.

FIG. 1 depicts an exemplary embodiment of a battery storage system 10 having a battery holding apparatus 12 for holding one or more batteries 15. Each battery 15 may be a lithium-ion rechargeable battery, such as the types of batteries typically used in many cellular telephones or other portable consumer electronic devices, but other types of batteries are possible in other embodiments. Various types of battery holding apparatuses 12 may be used for the system 15. As an example, the battery holding apparatus 12 may define a container, such as a box, into which batteries 15 are inserted. In other embodiments, the battery holding apparatus 12 may have cavities that are dimensioned to receive and hold one or more batteries 15. As an example, FIGS. 2 and 3 show an exemplary embodiment of a battery holding apparatus 12 having a plurality of cavities (e.g., slots) 22 for receiving and holding a plurality of batteries 15. In this regard, each cavity 22 may be dimensioned to receive a battery 15 and may have conductive terminals 25, 26 for making electrical contact with the anode and cathode, respectively, of the battery 15 inserted into the cavity 22. The battery 15 may snugly fit between the terminals 25, 26 or other components (e.g., one or more walls of the cavity 22) such that the battery 15 is held in place via frictional forces between the battery 15 and the apparatus 12. In other embodiments, other configurations of the battery holding apparatus 12 and other techniques for holding the batteries 15 are possible.

In the embodiment shown by FIG. 2, the battery holding apparatus 12 has a plurality of output devices 29 that are respectively associated with the slots 22. Each output device 29 provides an output indicative of a state of the battery 15 that is inserted into the associated cavity 22. In the embodiment shown by FIG. 2, an output device 29 is located directly beneath its associated cavity 22 but other locations of the output devices 29 are possible.

Each output device 29 may be any device capable of communicating an output to a user. As an example, an output device 29 may be a speaker or display (e.g., a liquid crystal display (LCD)) for audibly or visually providing an output, such as a measured charge level or temperature of the battery 15 inserted into the associated cavity 22. In some embodiments, an output device 29 may comprise a light source, such as a light emitting diode (LED), that illuminates light of a certain brightness or color to indicate a state of the battery 15 in the associated cavity 22. As an example, the output device 29 may illuminate light of a specific color once the measured charge of the battery 15 reaches a threshold level (e.g., is fully discharged or is discharged below a predefined level). Other types of output devices 29 may be used in other embodiments.

Figure 4:
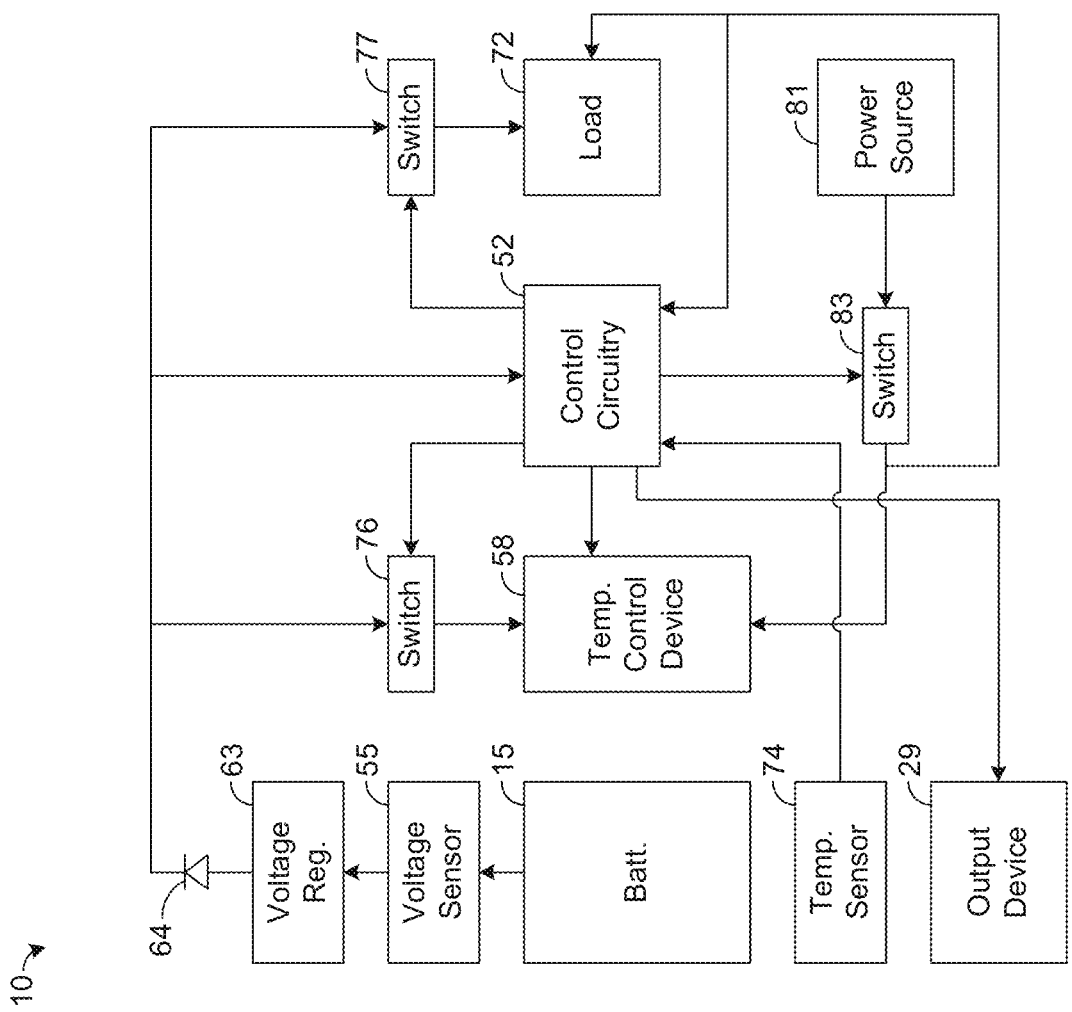
FIG. 4 is a block diagram illustrating an exemplary embodiment of circuitry for a battery storage system, such as is depicted by FIG. 1.

FIG. 4 depicts an exemplary embodiment of electrical circuitry of the battery storage system 10. Note that the circuitry of FIG. 4 may be embedded in or otherwise reside on or be coupled to the battery holding apparatus 12 of FIG. 1. For simplicity of illustration, FIG. 4 shows the circuitry of the containment system 10 coupled to a single battery 15, but the circuitry may be coupled to any number of batteries 15 in other embodiments.

As shown by FIG. 4, the battery storage system 10 comprises control circuitry 52 that generally controls the operation of the system 10, as will be described in more detail hereafter. The control circuitry 52 may be implemented in hardware or a combination of hardware with software and/or firmware. As an example, the control circuitry 52 may comprise one or more field programmable gate arrays (FPGAs) or application-specific integrated circuits (ASICs). In some embodiments, the control circuitry 52 may comprise one or more processors (e.g., microprocessors) programmed with software and/or firmware that when executed by the processor cause the processor to perform the functions described herein for the control circuitry 52. In other embodiments, yet other configurations of the control circuitry 52 are possible.

The battery 15 shown by FIG. 4 is electrically connected to a voltage sensor 55 that is configured to sense a voltage of the battery 15, thereby providing a measurement indicative of a charge level of the battery 15. Measurements by the sensor 55 are received and processed by the control circuitry 52, as will be described in more detail below.

The battery 15 is also electrically connected to a temperature control device 58 through a voltage regulator 63 and a diode 64. The voltage regulator 63, such as a direct current-to-direct current (DC-to-DC) converter, is configured to provide a regulated output voltage for driving the temperature control device 58 or other load as may be desired. The temperature control device 58 is configured to cool or heat the battery 15 or the air around the battery 15 in order to control the temperature of the battery 15 as may be desired. As an example, the device 58 may comprise a conventional heating element having a relatively high resistance that generates heat when current flows through heating element. In addition to or in lieu of a heating element, the device 58 may comprise a conventional cooling element, such as a heat pump that transfers heat away from the area of the battery 15 or a thermoelectric cooling device (e.g., a Peltier cooling device). The temperature control device 58 may be configured to operate under the control of the control circuitry 52 in an effort to keep the temperature of the battery 15 at a desired temperature or within a desired temperature range.

In some embodiments, the system 10 has a load 72 that may be driven by power from the battery 15, thereby further discharging the battery 15. The load 72 may be a resistive device 72 that dissipates power for the primary purpose of discharging the battery 15. In other embodiments, the load 72 may be used to provide a desired function associated with operation of the system 10. As an example, the load 72 may be a display device that is used to display information to a user or a communication device, such as a radio frequency (RF) transceiver or other type of transceiver for communicating information with devices external to the system 10. Yet other functions of the load 72 are possible in some embodiments.

As shown by FIG. 4, the control circuitry 52 may be electrically coupled to one or more temperature sensors 74 (e.g., thermistors) that are configured to measure a temperature associated with the battery 15. As an example, a temperature sensor 74 may be thermally coupled to the battery 15 so that it measures a temperature of the battery 15. In another embodiment, the temperature sensor 74 may be placed near the battery 15 (e.g., in the same cavity or compartment) and measure a temperature of the air surrounding the battery 15.

As further shown by FIG. 4, the battery 15 may be electrically coupled to the temperature control device 58 and the load 72 through switches 76, 77, respectively, that are used to allow the control circuitry 52 to select which of the temperature control device 58 or the load 72 is driven by power from the battery 15. As an example, the control circuitry 52 may transition both switches 76, 77 to a closed state, thereby electrically connecting both the temperature control device 58 and the load 72 to the battery 15, if the battery 15 is to drive both of the temperature control device 58 and the load 72. However, if the battery 15 is to drive only one of the temperature control device 58 and the load 72, then the control circuitry 52 may close the switch 76, 77 that is coupled to the component to be driven and open the other switch. As an example, the control circuitry 52 may close the switch 76 and open the switch 77 to enable the temperature control device 58 to cool the battery 15 until the temperature measured by the temperature sensor 74 reaches a threshold temperature. Once the measured temperature reaches such threshold, the control circuitry 52 may open the switch 76, thereby stopping further cooling by the temperature control device 58, and close the switch 77 so that the battery 15 may continue discharging.

In this regard, as noted above, it is generally desirable to reduce the temperature of the battery 15 in order to reduce the likelihood of thermal runaway. However, cooling a battery 15 to an excessively low temperature may affect the performance of the battery 15, thereby preventing full discharge. The control circuitry 52 may control operation of the temperature control device 58 such that it does not continue to cool the battery 15 below a threshold temperature. In some embodiments, instead of just activating and deactivating the cooling function of the temperature control device 58 in order to keep the measured temperature in a desired range, the control circuitry 52 may control the temperature control device 58 to selectively cool or heat the battery 58 based on the temperature measured by the temperature sensor 74 in order to keep the measured temperature within the desired range. Various other techniques for controlling the operation of the temperature control device 58 and the measured temperature are possible in other embodiments.

In some embodiments, the system 10 may have a power source 81, such as one or more batteries (not specifically shown in FIG. 4) or an alternating current (AC) source that is coupled to a wall outlet. In the embodiment shown by FIG. 4, the power source 81 may be electrically coupled to various components of the system 10 through one or more switches 83 to selectively provide electrical power to such components. In this regard, the control circuitry 52 may monitor the charge level of the battery 15 via measurements from the voltage sensor 55 and determine when the charge level of the battery 15 is sufficient to charge various components. As an example and as described above, the battery 15 may provide power to the temperature control device 58, the control circuitry 52, and/or the load 72. If the charge level of the battery 15 is sufficiently high, then the control circuitry 52 may control the switches 83 (e.g., open the switches 83) to disable the power source 81 from providing electrical power to the other components in order to help discharge the battery 15. However, if the charge level of the battery 15 falls below a certain threshold, then the control circuitry 52 may control the switches 83 (e.g., close one or more of the switches 83) to enable the power source 81 to provide electrical power to one or more other components, such as the temperature control device 58 or the control circuitry 52. Note that it is possible for any component to simultaneously receive power from both the battery 15 and the power source 81.

As an example, a component (e.g., the temperature control device 58) may initially be powered only by the battery 15, thereby discharging the battery 15. When the charge level of the battery 15 fails below a threshold, the control circuitry 52 may open the switch 83 coupled between the temperature control device 58 and the power source 81 to enable the power source 81 to provide power to the temperature control device 58, thereby supplementing the power from the battery 15 to ensure that the temperature control device 58 is adequately powered. Once the battery 15 is fully discharged, the temperature control device 58 may remain powered by the power source 81 so that it continues to keep the temperature of the battery 15 in a desired range. Similar techniques may be used for other components powered by the battery 15 in order to dissipate power from the battery 15 for a time but ensure continued operation of the component once the battery 15 becomes depleted.

Notably, using power from the battery 15, as described above, to drive one or more components of the system 10 simultaneously achieves multiple purposes that help to reduce the threat of thermal runaway in an efficient manner. In this regard, driving the temperature control device 58 with power from the battery 15 not only helps both to discharge and cool the battery 15, thereby reducing the likelihood of thermal runaway, but also helps to conserve energy from the power source 81. Further, in some embodiments, energy from the power source 81 may be limited, such as when the power source 81 comprises one or more batteries. In such an embodiment, utilization of the energy remaining in the battery 15 to drive the temperature control device 58 (or other components of the system 10) conserves power from the battery or batteries of the power source 81, thereby extending the useful life of the power source 81.

Figure 5:
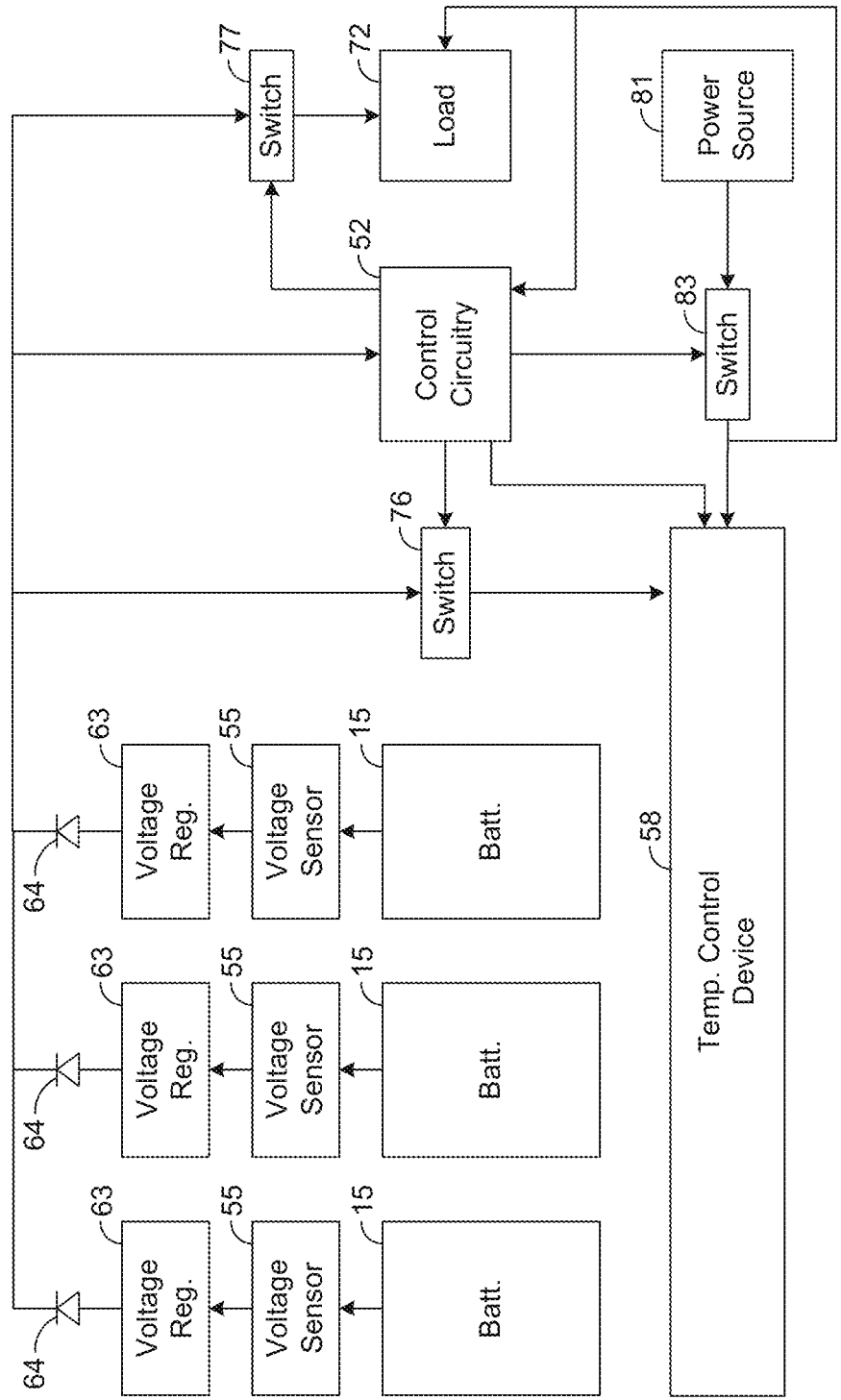
FIG. 5 is a block diagram illustrating an exemplary embodiment of circuitry for a battery storage system, such as is depicted by FIG. 1.

As noted above, the system 10 may store any number of batteries 15. FIG. 5 depicts an exemplary embodiment of the system 10 while it is storing three batteries 15. Except as otherwise described below, the configuration and operation of the system 10 depicted by FIG. 5 may be assumed to be the same as described above for FIG. 4. Note that FIG. 5 does not show output devices 29 and temperature sensors 74 for simplicity of illustration, though such devices may be included. In the embodiment depicted by FIG. 5, the batteries 15 are connected in parallel to drive the temperature control device 58 and/or other components of the system 10. The presence of the diodes 64 helps to ensure that current does not flow into a battery 15 due to any voltage differences among the batteries (e.g., resulting from different charge levels). As long as charge remains in any of the batteries 15, the temperature control device 58 or other components of the system 10 may be powered at least partially from the batteries 15 containing charge, thereby discharging such batteries 15 over time, as described above for the battery 15 shown by FIG. 4.

FIGS. 2 and 3 show an exemplary embodiment of a battery holding apparatus 12 that holds batteries 15 removed from one or more electronic devices (not shown). In some embodiments, it is unnecessary for the batteries 15 to be removed from the electronic devices to which they are coupled for normal use. As an example, one or more electronic devices may be mounted on or otherwise coupled to the apparatus 12 such that an electrical connection is made between the battery 15 of the electronic device and the circuitry of the apparatus 12. The battery 15 may then be discharged by the circuitry of the apparatus 12 as described above for the embodiments depicted by FIGS. 4 and 5.

Figure 6:
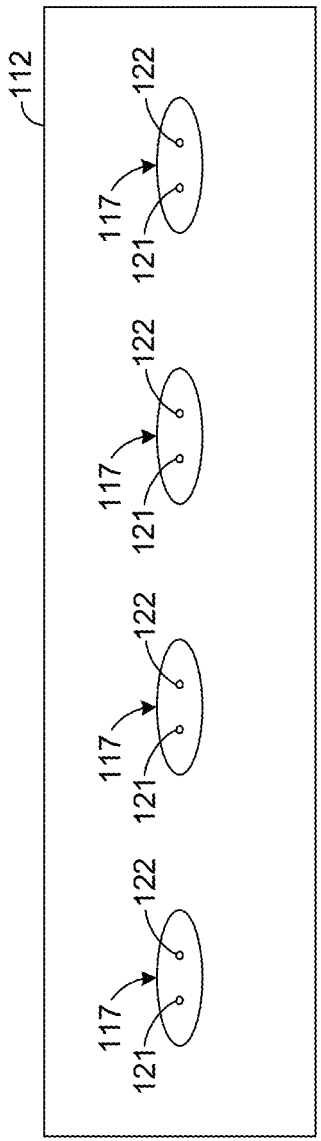
FIG. 6 is a top view of a battery holding apparatus, such as is depicted by FIG. 1.
Figure 7:
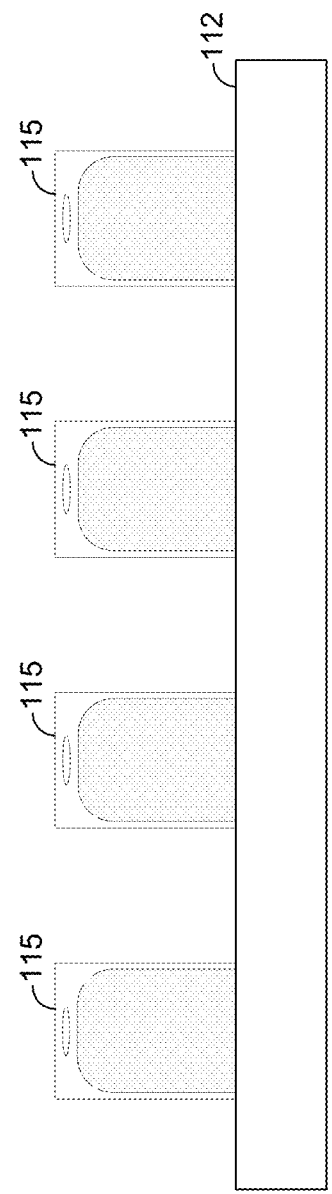
FIG. 7 is a side view of the battery holding apparatus depicted by FIG. 6 with cellular telephones inserted into cavities of the battery holding apparatus.

As an example, assume that the batteries 15 are used in cellular telephones. FIGS. 6 and 7 depict an exemplary embodiment of a battery holding apparatus 112 that may be used hold a plurality of cellular telephones 115 and thus the batteries 15 (not shown in FIGS. 6 and 7) contained in the cellular telephones 115. FIG. 6 depicts a top view of the apparatus 112 without any cellular telephones 115. As shown by FIG. 6, the upper surface of the battery holding apparatus 112 has a plurality of cavities 117, and each cavity 117 may be dimensioned for receiving a base or other portion of a cellular telephone 115. Thus, as shown by FIG. 7, a cellular telephone 115 may be mounted on the apparatus 112 by inserting the base of the cellular telephone 115 into a cavity 117 such that the cellular telephone 115 is held by gravity in the cavity 117. In some cases, the cellular telephone 115 may snugly fit in the cavity 117 such that frictional forces between the cellular telephone 115 and the wall of the cavity 117 help to hold the cellular telephone 115 in place.

As shown by FIG. 6, conductive terminals 121, 122 may be exposed within each cavity 117 for making electrical contact with conductive terminals of the cellular telephone 121, 122 thereby providing an electrical connection between the battery 15 of the cellular telephone 115 and the circuitry of the system 10. In other embodiments, other techniques for making an electrical connection between the battery 15 and the circuitry of the system 10 are possible. As an example, in some embodiments, the electrical connection may be wireless (e.g., an inductive coupling) such that it is unnecessary for a conductive component of the apparatus 112 to contact a conductive component of the battery 15 or cellular telephone 115. In such an embodiment, the cellular telephone 115 or the battery 15 itself may have a coil (not shown) for making an inductive coupling with a coil (not shown) connected to the circuitry of the system 10.

For example, through inductive coupling, a wireless transfer of power may occur between the battery 15 and the circuitry of the system 10 such that energy from the battery 15 is used to power the temperature control device 58 or other components of the system 10. In such an embodiment, it is unnecessary for the cellular telephone 115 or the battery 15 to be inserted into a cavity 117 or otherwise secured to the apparatus 112. As an example, a user may simply lay a cellular telephone 115 or a battery 15 (e.g., when the battery 15 is removed from the cellular telephone or other electronic device in which it is used) on a surface of the apparatus 112 such that an inductive coupling is made between the battery 15 and the circuitry of the system 10. In other embodiments, yet other techniques for making an electrical connection between a battery 15 and the circuitry of the system 10 are possible.

Note that the remaining energy in the batteries 15 may be used for self-cooling (i.e., cooling of the batteries 15 that are driving the temperature control device 58) when they are contained by electronic devices, such as the cellular telephones 115, just as in the embodiments for which the batteries 15 are removed from their electronic devices. In this regard, the temperature control device 58 may be used to cool the electronic device, thereby cooling the battery 15 contained within or otherwise coupled to the electronic device. For example, in FIG. 7, the temperature control device 58 (and other electronics of the system 10) may be embedded within the apparatus 112, and the temperature control device 58 may cool the wall of the cavity 117, which is thermally connected to the base of the cellular telephone 115. Thus, cooling by the temperature control device 58 helps to reduce the temperature of the base of the telephone 115 and, thus, the battery 15 that is contained within such base.

In some embodiments, the system 10 may be used to collect batteries 15 and discharge them prior to transportation of the batteries 15 to a desired destination, such as a battery recycling facility. Discharging the batteries 15 as described herein makes the batteries 15 safer for transportation and processing at a battery recycling facility by decreasing the likelihood of thermal runaway. Further, during transport, the temperature of the batteries 15 may be controlled to help further reduce the likelihood of thermal runaway. For example, once the batteries 15 have been discharged and cooled by the system 10, the batteries 15 may be removed from the battery holding apparatus 12, 112 and placed in a temperature-controlled container for shipment. Alternatively, the battery holding apparatus 12, 112 along with the batteries 15 may be placed in a temperature-controlled container. Such temperature-controlled container may be insulated to reduce thermal transfer with the surrounding environment. In addition, the temperature-controlled container may be actively or passively cooled. As an example, the container may be surrounded by or situated in a phase-change material (PCM), such as ice, liquid nitrogen, or other known PCMs, in order to help keep the container and its contents in a desired temperature range.

If the battery holding apparatus 12, 112 is situated in a temperature-controlled container (e.g., container that is thermally insulated or has passive or active cooling) prior to full discharge of the batteries 15, then the temperature-controlled container may keep the batteries 15 cool once the batteries 15 are fully discharged. In such an embodiment, cooling of the batteries 15 and/or the battery holding apparatus 12, 112 by the temperature control device 58 may help to absorb heat from or cool the temperature-controlled container in which the batteries are located, and the passive or active cooling by the temperature-controlled container may then help to keep the batteries 15 cool after they are discharged.

Figure 8:
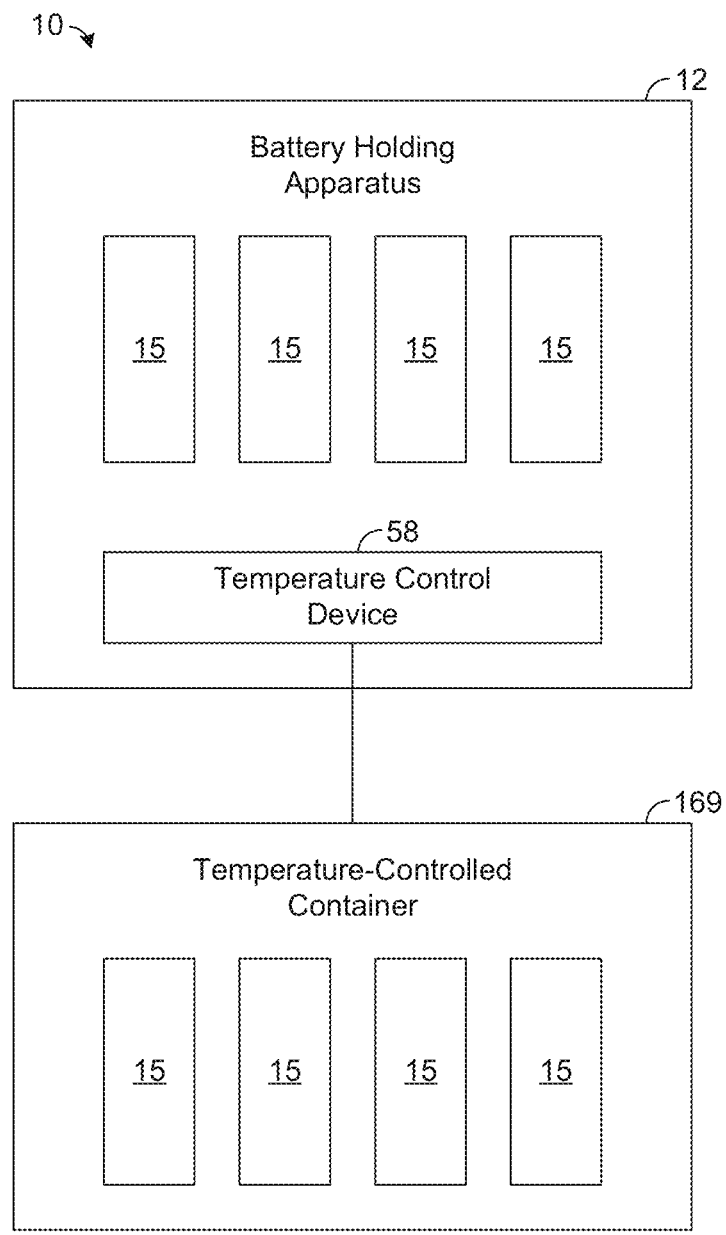
FIG. 8 is a block diagram illustrating an exemplary embodiment of a battery containment system having a temperature-controlled container that is cooled by batteries being discharged.

FIG. 8 depicts an exemplary embodiment in which discharged batteries 15 (e.g., batteries discharged according to any of the techniques described above) are placed in a temperature-controlled container 169. Batteries 15 that have yet to be fully discharged are held by a battery holding apparatus 12 having a temperature control device 58, as described above. In the embodiment depicted by FIG. 8, the temperature control device 58 is thermally coupled to the temperature-controlled container 169.

During operation, the batteries 15 of the battery holding apparatus 12 drive the temperature control device 58, which cools at least the temperature-controlled container 169 and, thus, the batteries 15 in the temperature-controlled container 169. If desired, the temperature control device 58 may also cool the batteries 15 in the battery holding apparatus 12 that are being discharged. In some embodiments, the temperature control device 58 may be external to the battery holding apparatus 12 (e.g., mounted on or in the temperature-controlled container 169) and receive power from the batteries 15 held by the apparatus 12.

The system 10 shown by FIG. 8 may be used during transport to cool a relatively large number of batteries 15 while discharging at least some of the batteries 15 held by the battery holding apparatus 12. In other embodiments, other configurations for actively cooling the temperature-controlled container 169 are possible. In addition, as described above, it is possible for the temperature-controlled container 169 to be passively cooled by a PCM or other techniques, such as passing cool air over the container 169. In such an embodiment, the temperature control device 58 may cool the PCM to help keep the temperature in the container 169 within a desired range.

In some embodiments, the system 10 may be portable so that it may be carried to various locations in order to collect batteries 15 or electronic devices (e.g., cellular telephones 115) containing batteries 15, although it is possible for the system 10 to be stationary, if desired. When the system 10 is portable, it may be desirable for the power source 81 (FIG. 4) to comprise one or more batteries such that utilization of the remaining power in the batteries 15 being discharged helps to extend the useful life of the power source 81. Further, utilization of the energy from the batteries 15 to cool the batteries 15 helps to make the batteries 15 safer for transportation or processing at a battery recycling center or other facility.

Figure 9:
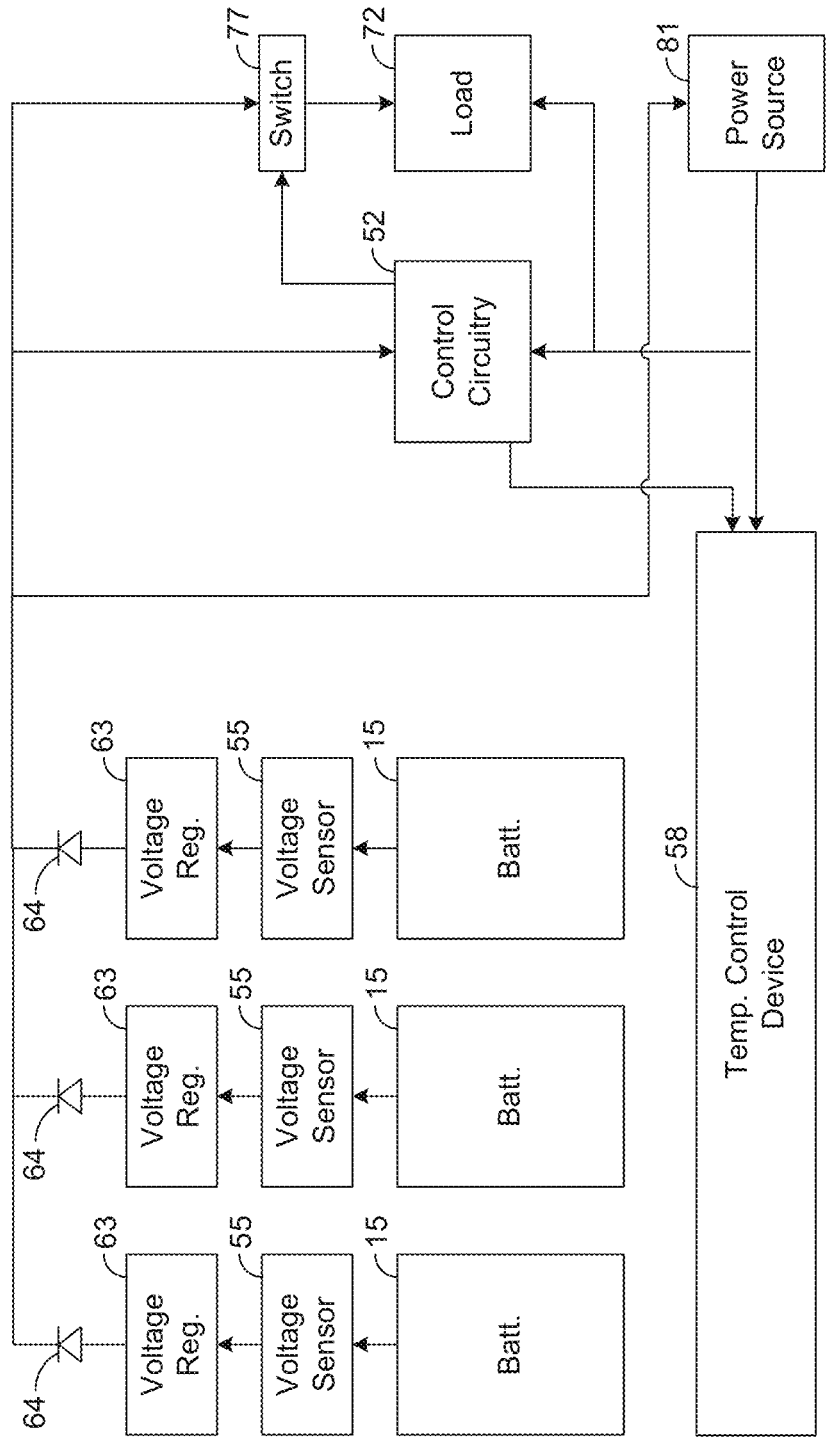
FIG. 9 is a block diagram illustrating an exemplary embodiment of circuitry for a battery storage system, such as is depicted by FIG. 1.

In various embodiments described above, self-cooling of the batteries 15 is described in the context of using energy from the batteries 15 to drive the temperature-control device 58 directly. However, such direct driving of the temperature control device 58 is unnecessary. As an example, it is possible for the batteries 58 to be electrically connected to the power source 81, as shown by FIG. 9. In such an embodiment, energy from the batteries 15 may be used to charge or otherwise replenish energy drawn from the power source 81, which drives the temperature control device 58. In such an embodiment, the energy from discharging of the batteries 15 helps to increase the useful life of the power source 81. As an example, the power source 81 may comprise rechargeable batteries (not specifically shown) that are recharged by energy from the batteries 15. Note that, as described for other embodiments, the energy from the batteries 15 held by the apparatus 12 may be used for other purposes, such as powering the load 72 or other system components.

In some embodiments, the system 10 may be used for transporting batteries 15 or electronic devices containing batteries 15 to a desired destination, such as a battery recycling facility or other facility. As an example, the system 10 (including the battery holding apparatus 12) may be mounted on a vehicle (not shown) for transport by the vehicle. In such an embodiment, discharging the batteries 15 for self-cooling operations helps to lower the charge levels of the batteries while efficiently utilizing the energy from such discharging to lower the temperature of the batteries 15 or keep their temperatures in a desired range, thereby decreasing the likelihood of thermal runaway. In addition, by monitoring the charge levels in the batteries 15 via the voltage sensors 55, the control circuitry 58 may be configured to provide information on the charge levels via the output devices 29, such as indicating whether each battery 15 is fully discharged or at least discharged below a threshold level. Thus, upon arriving at the destination, a user may view the output devices 29 to confirm whether the batteries 15 have been fully discharged and, thus, safe for certain processes, such as battery recycling.

If desired, the batteries 15 may be discharged to a threshold level prior to transportation. Such threshold level may be selected such that the remaining charge in the batteries 58 is at level reasonably safe for thermal runaway considerations but leaving a certain amount of charge for powering the temperature control device 58 during transport. In such embodiment, the system 10 may have a user interface (not shown) for receiving a user input indicating when the control circuitry 52 is permitted to allow the charge levels in the batteries 15 to be further depleted, such as when transportation has been initiated or is about to be initiated. In other embodiments, the system 10 may be configured to fully discharge each battery 15 as soon as it is electrically connected to the circuitry of the system 10. Yet other techniques for discharging the batteries 15 or determining when the batteries 15 are to be fully discharged or the level to which the batteries 15 are to be discharged are possible.

An exemplary use and operation of the system 10 will now be described in more detail below.

For illustrative purposes, assume that the batteries 15 are in discarded cellular telephones and are to be transported to a battery recycling facility. In such an embodiment, a user may collect the batteries 15 using a battery holding apparatus similar to the one depicted by FIG. 3 or the one depicted by FIG. 7. In this regard, the batteries 15 may be removed from the cellular telephones 15 and placed or mounted on a battery holding apparatus such that an electrical connection is made between the batteries 15 and the circuitry of the system 10. Alternatively, the cellular telephones 115 may be placed or mounted on a battery holding apparatus such that an electrical connection is made between the batteries and the circuitry of the system 10.

Once such electrical connectivity is made, the control circuitry 52 (FIG. 5) of the system 10 controls the temperature control device 58 of the system 10 such that power from the batteries 15 drives the temperature control device 58 for cooling the batteries 15. In some embodiments, the control circuitry 52 controls the temperature control device 58 based on temperature measurements from the temperature sensor 74 such that the measured temperature remains in a desired range.

While the batteries 15 are discharging and being cooled by the temperature control device 58, the control circuitry 52 monitors the charge levels in the batteries 15 based on the voltage sensors 55. When the charge of a battery 15 falls below a predefined threshold (e.g., is fully discharged), the control circuitry 52 is configured to control the associated output device 29 to indicate that the threshold level has been reached (e.g., the associated battery 15 is fully discharged). Once this indication is observed, a user may remove the discharged battery 15 from the system 10 and place it in a temperature-controlled container for transportation. By being discharged and cooled by the system 10, the threat of thermal runaway is reduced, and the batteries 15 are safer for transportation and processing.

Now, therefore, the following is claimed:

1. A battery storage system, comprising:
a plurality of batteries; and
a battery holding apparatus configured to hold and discharge the plurality of batteries to reduce charge levels of the plurality of batteries, the battery holding apparatus having a plurality of slots, each of the plurality of slots for receiving a respective one of the plurality of batteries or a device containing a respective one of the plurality of batteries, the battery holding apparatus having a temperature control device and circuitry electrically connected to at least one of the plurality of batteries, the circuitry configured to drive the temperature control device with power from discharging the at least one of the plurality of batteries, wherein the temperature control device is configured to control a temperature of one or more of the plurality of batteries, wherein each of the plurality of slots is associated with a respective one of a plurality of output devices, and wherein the circuitry is configured to sense a charge level of each of the plurality of batteries and to control the plurality of output devices such that each of the plurality of output devices indicates the sensed charge level of the respective one of the plurality of batteries inserted into the associated slot or contained by the device inserted into the associated slot.

2. The system of claim 1, wherein the battery holding apparatus has a temperature sensor for sensing a temperature associated with the at least one of the plurality of batteries, and wherein the circuitry is configured to control the temperature control device based on the temperature sensed by the temperature sensor.

3. The system of claim 1, wherein the temperature control device comprises a cooling element for cooling the at least one of the plurality of batteries.

4. The system of claim 3, wherein the circuitry has a temperature sensor for sensing a temperature associated with the at least one of the plurality of batteries, and wherein the circuitry is configured to compare the sensed temperature to a threshold and to deactivate the cooling element in response to a determination that the sensed temperature is below the threshold.

5. The system of claim 1, wherein the plurality of batteries is electrically connected to the temperature control device in parallel.

6. The system of claim 1, wherein the circuitry has a power source electrically coupled to the temperature control device for driving the temperature control device, wherein the circuitry has a sensor for sensing a charge level of the at least one of the plurality of batteries, and wherein the circuitry is configured to control an amount of power from the power source used to drive the temperature control device based on the sensed charge level.

7. The system of claim 6, wherein the circuitry has a first switch electrically coupled between the at least one of the plurality of batteries and the temperature control device, and wherein the circuitry is configured to control the first switch based on the sensed charge level.

8. The system of claim 7, wherein the circuitry has a second switch electrically coupled between the at least one of the plurality of batteries and the power source, and wherein the circuitry is configured to control the second switch based on the sensed charge level.

9. The system of claim 1, wherein the at least one of the plurality of batteries is in a cellular telephone, and wherein the cellular telephone is held by the battery holding apparatus.

10. A battery storage method, comprising:
receiving, in each of a plurality of slots of a battery holding apparatus, a respective one of a plurality of batteries or a device containing a respective one of the plurality of batteries, wherein each of the plurality of slots is associated with a respective one of a plurality of output devices;
holding the plurality of batteries with the battery holding apparatus;
discharging the plurality of batteries with the battery holding apparatus to reduce charge levels of the plurality of batteries;
driving a temperature control device of the battery holding apparatus with power from discharging at least one of the plurality of batteries;
sensing a charge level of each of the plurality of batteries;
controlling the plurality of output devices such that each of the plurality of output devices indicates the sensed charge level of the respective one of the plurality of batteries inserted into the associated slot or contained by the device inserted into the associated slot; and
controlling a temperature of one or more of the plurality of batteries with the temperature control device.

11. The method of claim 10, further comprising:
sensing, with a temperature sensor, a temperature associated with the at least one of the plurality of batteries; and
controlling the temperature control device based on the sensed temperature.

12. The method of claim 10, wherein the temperature control element comprises a cooling element, and wherein the controlling a temperature comprises cooling the at least one of the plurality of batteries with the cooling element.

13. The method of claim 12, further comprising:
sensing, with a temperature sensor, a temperature associated with the at least one of the plurality of batteries;
comparing the sensed temperature to a threshold; and
deactivating the cooling element based on the comparing when the sensed temperature is below the threshold.

14. The method of claim 10, wherein the plurality of batteries is electrically connected to the temperature control device in parallel.

15. The method of claim 10, further comprising:
driving the temperature control device with power from a power source;
sensing a charge level of the at least one of the plurality of batteries with a sensor; and
controlling an amount of power from the power source used to drive the temperature control device based on the sensed charge level.

16. The method of claim 15, further comprising controlling, based on the sensed charge level, a first switch electrically coupled between the at least one of the plurality of batteries and the temperature control device.

17. The method of claim 16, further comprising controlling, based on the sensed charge level, a second switch electrically coupled between the at least one of the plurality of batteries and the power source.

18. The method of claim 10, wherein the at least one of the plurality of batteries is in a cellular telephone, and wherein the holding comprises holding the cellular telephone with the battery holding apparatus.

19. The system of claim 1, wherein each of the plurality of output devices comprises a light source configured to emit light, and wherein a color of the light indicates the sensed charge level of the respective one of the plurality of batteries inserted into the associated slot or contained by the device inserted into the associated slot.

20. The system of claim 3, wherein the temperature control device comprises a heating element for heating the at least one of the plurality of batteries.

21. The system of claim 1, wherein each of the plurality of batteries is in a cellular telephone inserted into a respective one of the plurality of slots.

22. The system of claim 21, further comprising conductive terminals exposed in each of the plurality of slots for providing electrical connections between the plurality of batteries and the circuitry.

23. The system of claim 22, wherein each of the plurality of slots is dimensioned such that the cellular telephone inserted into the respective slot snugly fits in the respective slot.

24. The system of claim 1, wherein the battery holding apparatus further comprises a plurality of diodes, each diode of the plurality of diodes is connected to a corresponding battery of the plurality of batteries to prevent a flow of current into the corresponding battery.

25. A battery storage system, comprising:
a plurality of batteries; and
a battery holding apparatus configured to hold and discharge the plurality of batteries to reduce charge levels of the plurality of batteries, the battery holding apparatus having a plurality of slots, each of the plurality of slots for receiving a respective one of the plurality of batteries or a device containing a respective one of the plurality of batteries, the battery holding apparatus having a temperature control device and circuitry electrically connected to at least one of the plurality of batteries, the circuitry configured to drive the temperature control device with power from discharging the at least one of the plurality of batteries, wherein the temperature control device is configured to control a temperature of one or more of the plurality of batteries.

26. The system of claim 25, wherein each of the plurality of slots is associated with a respective one of a plurality of output devices, and wherein the circuitry is configured sense a charge level of each of the plurality of batteries and to control the plurality of output devices such that each of the plurality of output devices indicates the sensed charge level of the respective one of the plurality of batteries inserted into the associated slot or contained by the device inserted into the associated slot.

* * * * *